US010914690B2

(12) United States Patent
Schneider et al.

(10) Patent No.: US 10,914,690 B2
(45) Date of Patent: Feb. 9, 2021

(54) METHOD FOR CHARACTERISING A PART

(71) Applicants: SAFRAN AIRCRAFT ENGINES, Paris (FR); CENTRE NATIONAL DE LA RECHERCHE SCIENTIFIQUE, Paris (FR); ECOLE NORMALE SUPERIEURE DE CACHAN, Cachan (FR)

(72) Inventors: Julien Schneider, Moissy-Crayamel (FR); Francois Hild, Chatenay Malabry (FR); Hugo Leclerc, Cachan (FR); Stephane Roux, Rosny Sous Bois (FR)

(73) Assignees: SAFRAN AIRCRAFT ENGINES, Paris (FR); CENTRE NATIONAL DE LA RECHERCHE SCIENTIFIQUE, Paris (FR); ECOLE NORMALE SUPERIEURE DE CACHAN, Cachan (FR)

( * ) Notice: Subject to any disclaimer, the term of this patent is extended or adjusted under 35 U.S.C. 154(b) by 307 days.

(21) Appl. No.: 15/106,154

(22) PCT Filed: Dec. 9, 2014

(86) PCT No.: PCT/FR2014/053229
§ 371 (c)(1),
(2) Date: Jun. 17, 2016

(87) PCT Pub. No.: WO2015/092212
PCT Pub. Date: Jun. 25, 2015

(65) Prior Publication Data
US 2018/0195978 A1 Jul. 12, 2018

(30) Foreign Application Priority Data

Dec. 19, 2013 (FR) ..................... 13 63095

(51) Int. Cl.
G01N 23/046 (2018.01)
G06T 7/00 (2017.01)
G06K 9/00 (2006.01)

(52) U.S. Cl.
CPC ....... *G01N 23/046* (2013.01); *G06K 9/00624* (2013.01); *G06T 7/001* (2013.01);
(Continued)

(58) Field of Classification Search
None
See application file for complete search history.

(56) References Cited

U.S. PATENT DOCUMENTS 6,041,132 A * 3/2000 Isaacs .................. G01N 23/046
378/21
2004/0165760 A1* 8/2004 Veneruso .............. G06T 7/0004
382/141

(Continued)

OTHER PUBLICATIONS

Leclerc, Hugo, et al. "Digital Volume Correlation: What are the limits to the spatial resolution? Corrélation d'images volumiques: quelles limites à la résolution spatiale?." Mechanics & Industry 13.6 (Published online Nov. 22, 2012).*

(Continued)

*Primary Examiner* — Vu Le
*Assistant Examiner* — Tracy Mangialaschi
(74) *Attorney, Agent, or Firm* — Oblon, McClelland, Maier & Neustadt, L.L.P.

(57) ABSTRACT

A method of characterizing a part including obtaining an X-ray tomography image of the part and then a step of correlating the image with a reference wherein the correlation step includes searching among a predefined set of X-ray tomography image transformations for a transformation that minimizes the difference between the image and the reference in order to characterize the inside of the part.

17 Claims, 3 Drawing Sheets

(52) U.S. Cl.
CPC ............... *G01N 2223/1016* (2013.01); *G01N 2223/419* (2013.01); *G01N 2223/425* (2013.01); *G01N 2223/426* (2013.01); *G01N 2223/615* (2013.01); *G01N 2223/63* (2013.01); *G01N 2223/645* (2013.01); *G06T 2207/10081* (2013.01); *G06T 2207/30164* (2013.01)

(56) References Cited

U.S. PATENT DOCUMENTS

| | | | | |
|---|---|---|---|---|
| 2009/0238432 | A1* | 9/2009 | Can | G06T 7/001 382/132 |
| 2010/0194749 | A1* | 8/2010 | Nightingale | G01N 23/046 345/424 |
| 2010/0220910 | A1* | 9/2010 | Kaucic | G06T 7/001 382/131 |
| 2016/0275688 | A1* | 9/2016 | Chiang | G01B 11/16 |

OTHER PUBLICATIONS

Pan, Bing, Dafang Wu, and Zhaoyang Wang. "Internal displacement and strain measurement using digital volume correlation: a least-squares framework." Measurement Science and Technology 23.4 (2012): 045002.*

Alghamdi A, Mummery P, Sheikh MA. Multi-scale 3D image-based modelling of a carbon/carbon composite. Modelling and Simulation in Materials Science and Engineering. Nov. 8, 2013;21(8):085014.*

Bay, B. K. "Methods and applications of digital volume correlation." The Journal of Strain Analysis for Engineering Design 43.8 (2008): 745-760. (Year: 2008).*

Roux, Stéphane, et al. "Three-dimensional image correlation from X-ray computed tomography of solid foam." Composites Part A: Applied science and manufacturing 39.8 (2008): 1253-1265. (Year: 2008).*

International Search Report dated Mar. 18, 2015, in PCT/FR2014/053229 Filed Dec. 9, 2014.

Leclerc, et al., "Digital Volume Correlation: What are the limits to the spatial resolution?" http://hal.inria.fr/docs/00184187/21/PDF/MI2012-ccsd.pdf, 2013, XP055129980 (42 pages).

Pan, et al., "Internal displacement and strain measurement using digital volume correlation: a least-squares framework," Measurement Science and Technology, vol. 23, No. 4, 2012, XP020221141 (13 pages).

Alghamdi, et al., "Multi-scale 3D image-based modelling of a carbon/carbon composite," Modelling and Simulation in Materials Science and Engineering, vol. 21, No. 8, 2013, XP020254298 (13 pages).

European Office Action dated Feb. 3, 2020 in European Patent Application No. 14 827 807.0, 5 pages.

Limodin, N., et al., "Analysis and Artifact Correction for Volume Correlation Measurements Using Tomographic Images from Laboratory X-Ray Source", Experimental Mechanics, vol. 51, 2011, pp. 959-970.

* cited by examiner

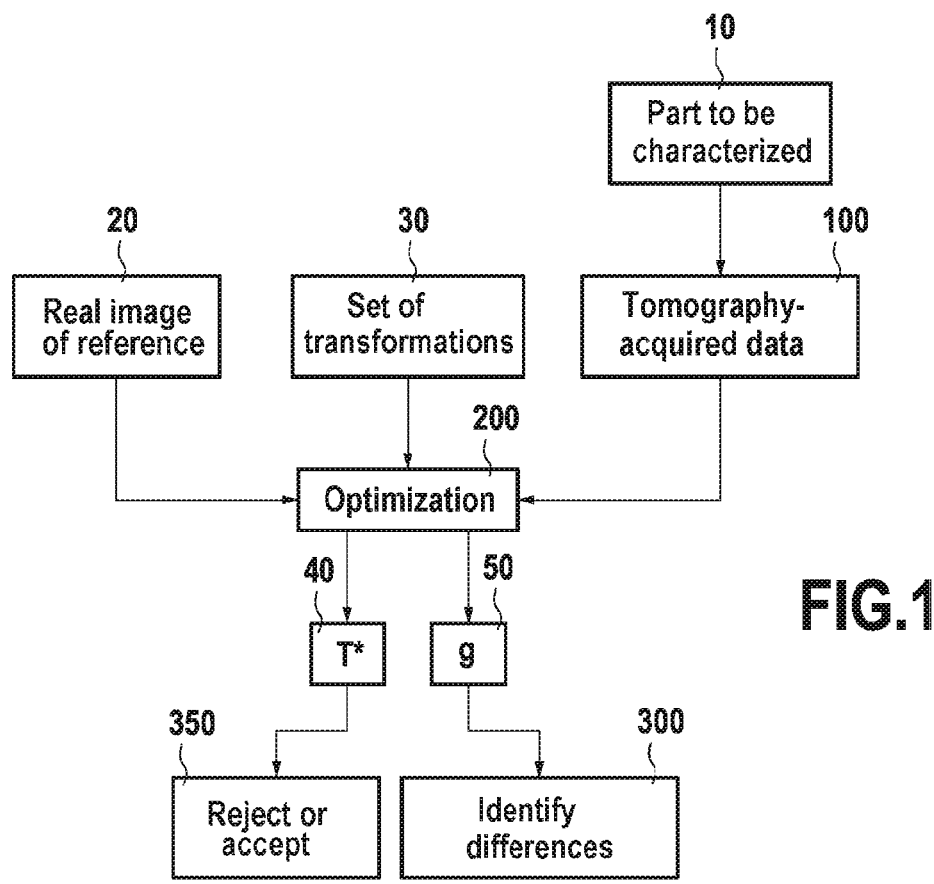
FIG.1
FIG.2
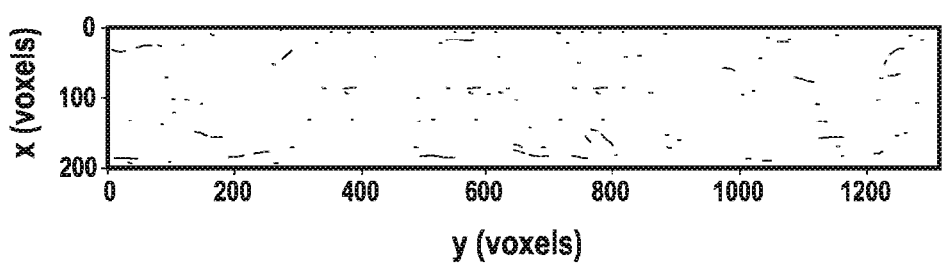

Residual correlation field
(in grey level)

FIG.5
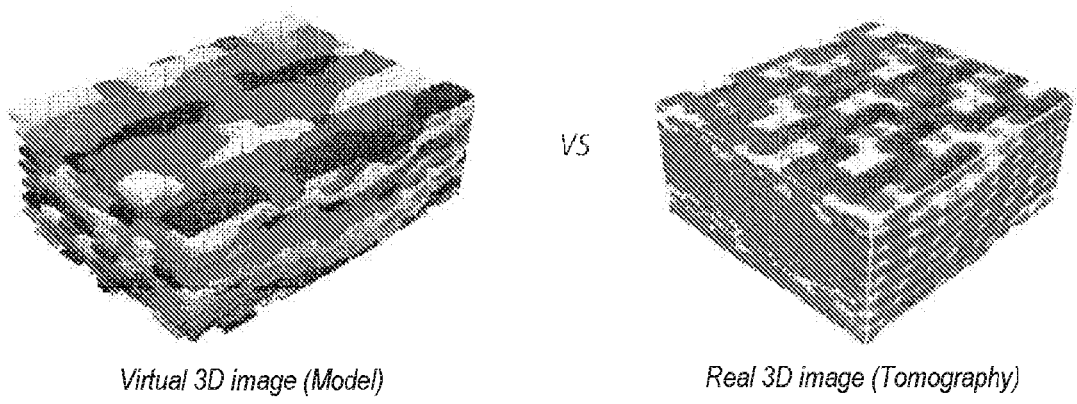
Virtual 3D image (Model)    vs    Real 3D image (Tomography)
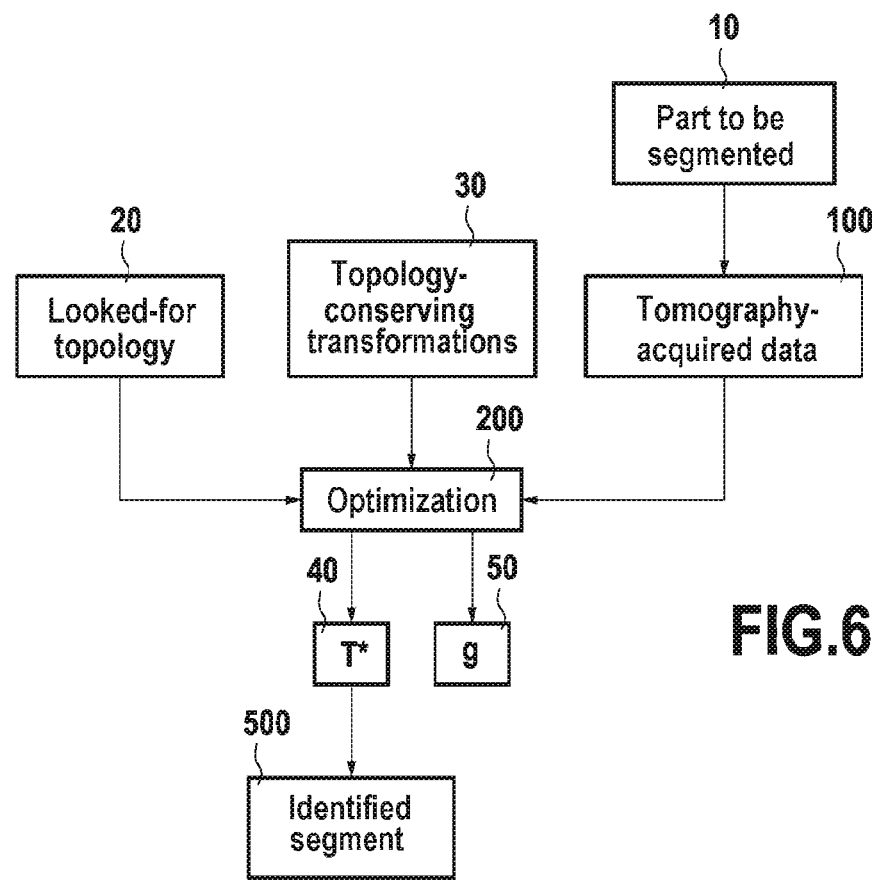
FIG.6

METHOD FOR CHARACTERISING A PART

TECHNICAL CONTEXT

The invention falls within the field of designing, characterizing, and tracking parts in industry, in particular parts that are to be subjected to high levels of mechanical stress, such as aeroengine parts for example.

The technique of X-ray computed tomography (CT) is known. This experimental technique makes use of different absorption of X-rays by different materials in order to reconstruct a three-dimensional image of the part under study by computation on the basis of a series of X-ray images. The information contained in tomography images is of great use since it relates to the entire volume of the part and gives access not only to its microstructure, but also essentially to its defects.

Nevertheless, this richness also gives rise to two major difficulties. Firstly, acquiring information with fine spatial resolution requires a large number of X-ray images, and thus a long time to acquire the images, and it requires considerable data storage means to be available. Furthermore, searching for defects is itself an operation that is difficult and demanding, and does not lend itself to automation.

Techniques are also known for comparing images that are similar to each other, known under the technical terms of image correlation or image alignment. Those techniques consist in putting two images into the best possible coincidence and doing so by determining a transformation belonging to a selected class. The residual difference (or "residues") between the images after applying the transformation reveals changes (or defects depending on context) that have not been eliminated by the transformation.

Between two images, modifications often take place in the form of movements of rigid bodies, and also in the form of enlargement or deformation. Such modifications may constitute the selected transformation class. It is then possible to calculate the residues for the optimum transformation within this particular class.

This concept may be formalized as follows. The gray level values for any point $\underline{x}$ in the two images are written $f_1(x)$ and $f_2(x)$. A set T of transformations (the class of transformations) is also introduced, such that for all transformation $T \in T$, the image $\underline{f}$ becomes the transformed image $T[f]$ (where T is a functional acting on the entire image $\underline{f}$). It is useful to identify the transformation T* (optimum transformation) that achieves the minimum:

$$T^* = \mathrm{argmin}_{T \in T} \|f_1(x) - T[f_2(x)]\|$$

The residue is a new image g defined as follows:

$$g(x) = f_1(x) - T^*[f_2(x)]$$

Furthermore, a generic class of transformations is that induced by the set of continuous displacement fields, u(x), which is such that:

$$T_u[f(x)] = f(x + u(x))$$

The topological difference $\Delta(f_1, f_2)$ of two images is the residue field g obtained when the class over which optimization is performed is the class of continuous displacement fields.

Nevertheless, by way of example, it is also possible to alter the brightness and the contrast of an image by an affine transformation such as:

$$T_g[f(x)] = \alpha f(x) + \beta$$

It is also possible to combine a plurality of transformations of this type, to constrain the parameters or the fields involved so as to satisfy specific constraints, or to give them more freedom. For example, the two parameters of the affine transformations described above ($\alpha$ and $\beta$) may be calculated as a function of the coordinates of the voxel in question.

Although some commercial programs exist for image correlation, it is unusual for them to give access to the raw and complete transformation T* that minimizes the difference between the images, since the displacement fields are often not constructed in global manner, but rather by interpolation between discrete local displacements. Furthermore, the brightness and contrast corrections are often not accessible. In practice, the transformation T* is thus often not used, even though the topological difference is used, e.g. for the purpose of recognizing a face, an article, or a specific shape, e.g. in medical imaging.

In certain uses, such as automatic recognition, the only part of the image alignment that is used is the association with a reference when the norm of the residue is considered to be small. Finally, even if the user of the computer program can be invited to make use of the residue or the topological difference on the screen, they are rarely produced as results that can be exported from image correlation software.

DEFINITION OF THE INVENTION AND ASSOCIATED ADVANTAGES

To solve the above-mentioned difficulties, there is proposed a method of characterizing a part, the method comprising a step of obtaining an X-ray tomography image of the part and then a step of correlating said image with a reference, the method being characterized in that the correlation step comprises searching among a predefined set—or class—of X-ray tomography image transformations for a transformation that minimizes the difference between said image and the reference in order to characterize the inside of the part.

Particularly, but not necessarily, the set of transformations may include continuous displacement fields, it being possible for each field to be discretized.

Preferably, the method uses a continuous parameterization of said set of transformations.

The advantage of this method can be seen from the following discussion. Specifically, the parameterization of the pertinent space T is of much smaller dimension than the image itself.

Specifically, at least in theory, it is possible to superpose two tomography images of the same object exactly by moving a rigid body with six degrees of freedom, by applying a scale factor with one degree of freedom, and by linearly adjusting gray levels with two degrees of freedom. Thus, in order to correlate these two images, it is necessary to determine nine unknowns. This number nine is the dimensionality of the space T and should be compared with the complexity of determining an entire image of the order of 1 Giga voxel, i.e. $10^9$ unknowns. Thus, knowing the transformation T* makes it possible to achieve considerable savings in terms of data. This also makes it possible to obtain the topological difference $\Delta(f_1, f_2)$ directly and to find therein defects that are incompatible with the transformation class T. Transformations that are more complex than those mentioned above may also be used.

This makes it possible to provide a rapid determination of the 3D image of a part by virtue of the above-described characteristic in which use is made of a set of transformations to be applied from one or more reference articles while making use of a smaller number of X-ray images than in the usual methods. This increase in speed for image acquisition implies that the tomography equipment is busy for a shorter length of time. This is done at the cost of less redundancy in the information since fewer X-ray images are taken, and also of an increase in the amount of computation needed, but in numerous situations these two aspects are no handicap.

By way of example, the set of transformations comprises at least one set of continuous displacements (with or without change of scale), at least one set of alterations of brightness and of contrast, or at least one set of scale changes (with or without continuous displacement).

In an implementation, the reference comprises the image of a standard part. In particular, it is possible, in this way or otherwise, to determine whether the particular part is acceptable, e.g. by using a transformation that is identified at the end of the search. It is specified that under such circumstances, the acceptable nature of the part may be formalized by expressing conditions on the identified transformation T*.

In a variant, the reference comprises an image, referred to as "virtual", of the part constructed from a computer assisted design model.

The set of transformations may comprise at least the transformations corresponding to modifications of at least one parameter of a model of the part.

Optionally in combination with the above-described aspects, the method may also include modifying the parameterization of a computer assisted design model of the part by using a transformation identified at the end of the search.

In a variant, the reference comprises an explicit representation of the boundaries of the part and of its components or elements, if any. Said set of transformations may then comprise at least a class of transformations that conserve topology. If the part has a plurality of components, the identified optimum transformation T* leads to the image being segmented on the basis of a priori knowledge about the article. The segmentation may also be performed differently, but still with the help of the identified transformation.

In a variant, the reference comprises the representation of an elementary pattern, e.g. a phase modulated periodic pattern.

The method may be performed using as the reference an X-ray tomography image of the part, the part having been subjected to a mechanical load between taking the two images. The topological difference then makes it possible to identify defects (in the above-defined sense of not being resorbable by the selected transformation class) as induced by the load. It is then possible, in this way or otherwise, to determine whether the nature of the defect and in particular its size, its shape, or its location is acceptable in the light of functional specifications, rules of art, or indeed standards constraints.

The method may be performed in particular with a part made of composite material, or an aircraft turbojet blade, which may specifically be made of fiber reinforced composite material, e.g. woven materials.

LIST OF FIGURES

The description of the invention is continued below with reference to the accompanying figures.

FIG. 1 shows an implementation of the invention. FIGS. 2 and 3 show examples of this implementation.

FIG. 5 illustrates this implementation.

FIG. 6 shows a third implementation of the invention.

DESCRIPTION OF IMPLEMENTATIONS

Figure 3:
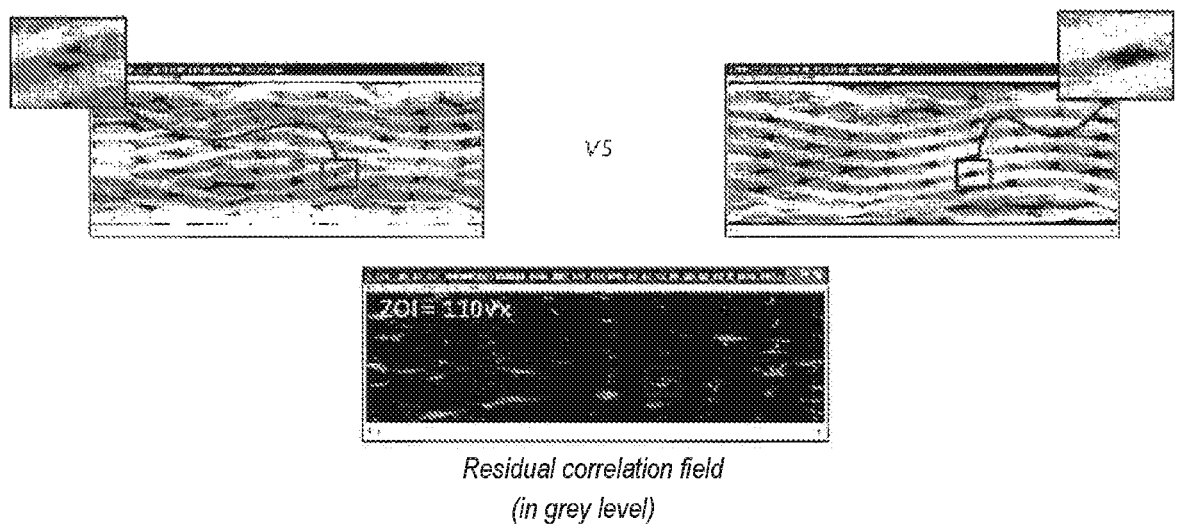

In an implementation as shown in FIG. 1, use is made of a real reference image 20, such as the image of a part that is used as a standard or a template. A part 10, e.g. a composite material part, is reconstructed in a raw tomography image of the part 10, made up from a quantity of tomographic data 100 (i.e. a number of projections) that may be small. The reconstruction is performed using a set of transformations 30 that are considered to be realistic. The computation is based on a step of searching for and identifying the transformation T* (reference 40) in the set 30. This identification is performed by searching for the minimum (optimization 200) as described in the introduction. Simultaneously, the associated topological difference Δ(reference 50) is determined.

In a variant, the differences between the part under study and the standard part are found and identified effectively by using the topological difference Δ(reference 50) during a step 300. For example, as shown in FIG. 2, comparing tomographs for a composite material part before and after testing under load shows up very clearly the presence of mesocracks.

It is also possible to establish a correlation between two different samples, and if they are parts made of composite material, this can reveal differences from a point of view weaving between the two samples. This is shown in FIG. 3.

In general manner, it is thus possible to perform non-destructive tests (NDT) on composite material parts, e.g. turbojet blades. The technique described leads to savings in time for inspecting, and acquiring and storing data. Thus, by way of example, during a step 350, it is possible merely on the basis of the transformation T*, to decide whether the part should be retained or rejected.

Figure 4:
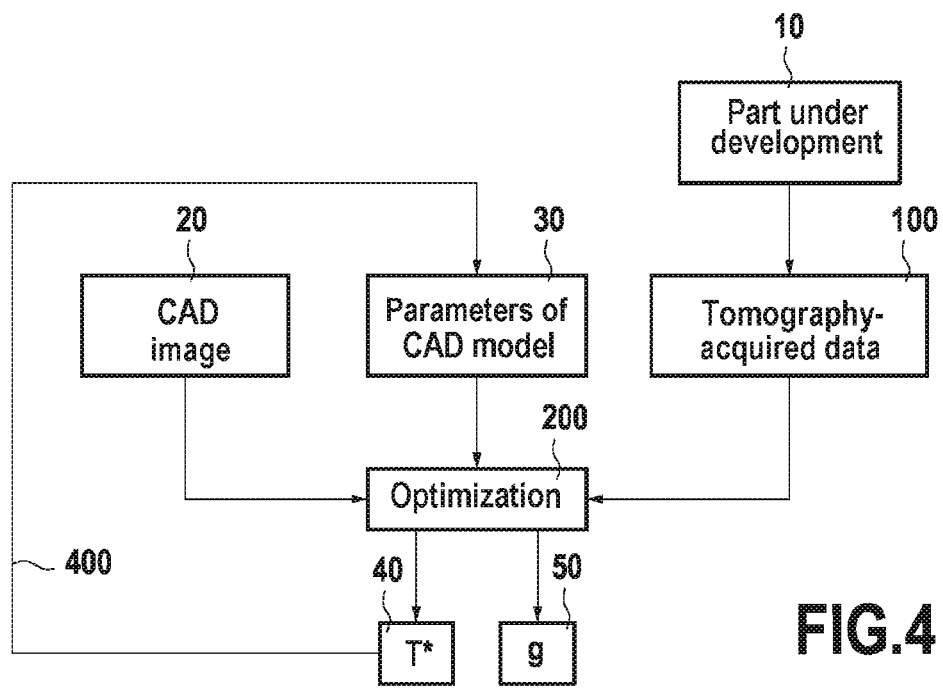
FIG. 4 shows a second implementation of the invention.

In another implementation, shown in FIG. 4, two images are put into correspondence, one a real image and the other an image referred to as a "virtual" image, e.g. an image 20 made up from a computer assisted design (CAD) model of the part.

Under such circumstances, the parameters 30 of the CAD model may themselves comprise a specific transformation class T. Thus, tomographic data can be used on the basis of the image of the CAD model by writing the tomographic image directly in a description language suitable for dialog with the CAD design team of the part.

The dialog then consists in providing, in the form of the CAD model, a good predetermination of the solution for assisting in constructing the tomographic image (step 200) on the basis of the tomographic data. In return, the image as constructed in this way then makes it possible, in a step 400, to correct the CAD model by means of the parameters of the identified transformation T* so that it is as close as possible to the part actually made.

The method is performed until the algorithm used converges or becomes stationary, e.g. in a simple context of adjusted gray levels.

Defects of orientation or of alignment can affect the response of the complete composite structure, and an initial adjustment as proposed is a good way of improving and validating a CAD model taking account of such imperfections.

3D models can be generated that are made discrete in the form of individual voxels or that are represented by a parametric model, or a computer assisted design (CAD) model, based on a priori knowledge about the woven array of composite fiber reinforcing materials. It is thus possible to correlate the image of a part and an image derived from a mold and to modify the input parameters of the model, i.e. the directions of the strands and also their dimensions. By way of example, FIG. 5 shows an image obtained by tomography and an image of a model.

In a variant, if the paths followed by the yarns are not included in the reference image obtained by a CAD model, the paths of the strands are determined directly from the tomographic image, e.g. by using a tracking algorithm, which is provided with the results of the correlation with the reference image obtained by a CAD model.

In a variant shown in FIG. 6, images are segmented. Segmentation 500 consists in identifying specific components within an image, e.g. strands or fibers or elementary patterns (e.g. a phase modulated periodic pattern), that might possibly be contained in a database constituting a dictionary. If a theoretical representation of the article to be identified is available (looked-for topology 20), it is then possible to correlate 3D images of this article with data 100 obtained by tomography. The transformations 30 used are performed with imposed topology, and make it possible to conserve the topology of the reference article in robust manner.

Using the identified transformation T*, the defined component in the reference image can thus be situated in the image and can be deformed in order to match the real image.

Thus, if it is desired to find a closed curve, it suffices to start with an ideal image of a closed line such as a perfect circle and then allow it to vary progressively towards the line as is present in the image of the medium.

This approach is more robust than the usual thresholding and segmenting techniques that do not automatically preserve the correct topology for the looked-for article. Thus, with these techniques, missing points in a curve that ought to be closed are obtained, or a thick curve is obtained when it ought to be fine.

The segmentation as performed in the described method, i.e. automatically on the basis of a previously defined topological element, serves to minimize intermediate steps of image filtering where the contributions of noise, bias, and measurements are not always easily determined, and thus where information is easily degraded by such filtering.

The invention is not limited to the implementations described, but extends to any variant within the ambit of the scope of the claims.

The invention claimed is:

1. A method of characterizing a part, the method comprising a step of obtaining an X-ray tomography image of the part and then a correlation step of correlating said image of the part with a reference comprising an image of a standard part differing from the part, wherein the correlation step comprises applying each of a predefined set of X-ray tomography image transformations to the image of the part to produce transformed images, determining respective differences between the transformed images and the reference, and searching among the predefined set of X-ray tomography image transformations for a transformation that minimizes a difference between the image of the part and the reference in order to characterize an inside of said part and determine a topological difference between the image of the part and the reference to find defects in the part.

2. A method according to claim 1 for characterizing a part, using a continuous parameterization of said set of transformations.

3. A method according to claim 1 for characterizing a part, wherein said set of transformations includes at least one set of continuous displacements, at least one set of alterations of brightness and of contrast, or at least one set of scale changes.

4. A method according to claim 1, for characterizing a part, further comprising determining whether the part is acceptable by using an extracted transformation.

5. A method according to claim 1, for characterizing a part, wherein said set of transformations comprises at least transformations corresponding to modifications of at least one parameter of a model of the part.

6. A method according to claim 1, for characterizing a part, wherein the reference comprises a virtual part constructed from a computer assisted design model.

7. A method according to claim 1, for characterizing a part, including modifying a parameterization of a computer assisted design model of the part by using a transformation identified at the end of the search.

8. A method according to claim 1, for characterizing a part, wherein said set of transformations comprises at least a class of transformations that conserve topology.

9. A method according to claim 1, for characterizing a part, wherein the reference comprises an explicit representation of boundaries of an element of the part.

10. A method according to claim 1, for characterizing a part, including segmenting the image of the part by using a transformation identified at the end of the search.

11. A method according to claim 1, for characterizing a part, wherein the reference comprises a representation of an elementary pattern.

12. A method according to claim 1, for characterizing a part, comprising identifying at least one of strands, fibers and elementary patterns in the image of the part.

13. A method according to claim 1, for characterizing a part, wherein the part is a composite material part.

14. A method according to claim 1, for characterizing a part, wherein the part is an aircraft turbojet blade.

15. A method according to claim 1, comprising:
identifying a specific component within the image of the part;
situating the specific component from a reference image in the image of the part; and
using the set of transformations to deform the specific component in the reference image to match the image of the part.

16. The method according to claim 1, wherein:
the set of transformations comprises a plurality of transformations; and
the searching comprises:
reconstructing an image using each transformation of the set of transformations to generate the set of transformed images, and
finding a difference between the reference and each of the transformed images.

17. The method according to claim 1, wherein the set of transformations comprises a plurality of transformations.

* * * * *